(12) United States Patent
Muylaert

(10) Patent No.: US 7,412,825 B2
(45) Date of Patent: Aug. 19, 2008

(54) FLOW PATH SPLITTER DUCT

(75) Inventor: Neal W. Muylaert, Apache Jct., AZ (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 11/163,137

(22) Filed: Oct. 6, 2005

(65) Prior Publication Data
US 2007/0080257 A1 Apr. 12, 2007

(51) Int. Cl.
*F01N 7/00* (2006.01)
*F01N 3/00* (2006.01)
*B64C 27/22* (2006.01)
*B64C 15/02* (2006.01)
*B64C 29/00* (2006.01)

(52) U.S. Cl. ............... 60/324; 287/292; 244/6; 244/12.3; 244/12.5; 244/12.6; 244/15

(58) Field of Classification Search ............ 60/287, 60/292, 324; 244/12.3, 15, 6, 12.6, 12.5
See application file for complete search history.

(56) References Cited

U.S. PATENT DOCUMENTS

| | | | | |
|---|---|---|---|---|
| 2,991,962 A | * | 7/1961 | Paikert | 244/17.19 |
| 3,096,826 A | * | 7/1963 | Amer et al. | 416/20 R |
| 3,159,360 A | * | 12/1964 | Ryan et al. | 244/7 A |
| 4,371,314 A | * | 2/1983 | Dauel et al. | 416/20 A |
| 4,407,466 A | * | 10/1983 | Thompson et al. | 244/17.11 |
| 4,473,335 A | * | 9/1984 | Henry | 416/20 A |
| 4,589,611 A | * | 5/1986 | Ramme et al. | 244/6 |
| 5,014,817 A | * | 5/1991 | Takato et al. | 181/254 |
| 5,113,652 A | * | 5/1992 | Baines et al. | 60/288 |
| 5,149,014 A | * | 9/1992 | Faller | 244/17.19 |
| 5,199,258 A | * | 4/1993 | Barth | 60/313 |
| 5,232,183 A | * | 8/1993 | Rumberger | 244/17.19 |
| 5,454,530 A | * | 10/1995 | Rutherford et al. | 244/7 A |
| 5,984,635 A | * | 11/1999 | Keller | 416/20 A |
| 6,131,849 A | * | 10/2000 | Nyhus | 244/17.11 |
| 6,381,953 B1 | * | 5/2002 | Glugla et al. | 60/284 |
| 6,471,158 B1 | * | 10/2002 | Davis | 244/8 |
| 6,669,137 B1 | * | 12/2003 | Chen | 244/7 R |
| 6,789,764 B2 | * | 9/2004 | Bass et al. | 244/10 |
| 6,885,917 B2 | * | 4/2005 | Osder et al. | 701/3 |

* cited by examiner

*Primary Examiner*—Thomas Denion
*Assistant Examiner*—Loren Edwards
(74) *Attorney, Agent, or Firm*—Ostrager Chong Flaherty & Broitman P.C.

(57) ABSTRACT

A flow path splitter duct is provided. The flow path splitter duct includes a main hub, a first outlet hub and a second outlet hub. The main hub has a plurality of inlet ports each being separated by at least one wall. The first outlet hub has a plurality of first duct outlet ports, each of the first duct outlet ports are in fluid communication with only one of the corresponding plurality of inlet ports. The second outlet hub has a plurality of second duct outlet ports, each of the second duct outlet ports are in fluid communication with only one of the corresponding plurality of inlet ports, wherein engine exhaust gas that enters one of the plurality of inlet ports is simultaneously diverted to only one of the first duct outlet ports and to only one of the second duct outlet ports. A vertical takeoff and landing aircraft is also provided that includes the flow path splitter duct. A method of using the same is also provided.

8 Claims, 3 Drawing Sheets

FLOW PATH SPLITTER DUCT

TECHNICAL FIELD

The present invention relates generally to aeronautical vehicle systems, and more particularly, to an article, system and method for providing directed fluid propulsion used for lift in a dual-mode aircraft having a vertical lift mode and a fixed wing mode of flight.

BACKGROUND OF THE INVENTION

In order to have vertical takeoff and landing capability of a helicopter and to have forward flight speed ability of another aircraft, different styles of vertical takeoff and landing (VTOL) aircraft are being introduced and becoming more abundant. One aircraft is the canard rotor/wing design. The canard rotor/wing (CRW) design typically includes a single wing centrally located or two offset wings located on an aircraft fuselage that may be operated in a helicopter mode and in a fixed wing mode. Each wing includes two symmetrical blades that operate irrespective of flow direction. In helicopter mode the wing of the CRW spins the rotor. In fixed wing mode the wing of the CRW is locked for fixed flight mode.

In helicopter mode, the CRW uses ducted engine exhaust gas that flows through a passage way and into nozzles located on both blades of the wing to spin the rotor head. The engine exhaust gas passes through the main conduit, passes up the main rotor mast, proportionally through the gas splitter duct and out through the each rotor hub and blade to spin the rotor head. Two or more engines may be utilized on the CRW when the aircraft increases in size or when there is a desire to have additional engines. While the ducted passageways may provide for the increase in engine exhaust gas produced by the multiple engines, there becomes a loss of efficiency through the nozzles and a potential loss of engine control when the CRW experiences a loss of engine or engine out. The loss of efficiency and engine control situation may also occur when less than all of the engines are operating while the CRW is in helicopter mode. Generally, this is known as the "1-engine out" situation.

It is therefore, desirable to provide a VTOL aircraft having increased performance and engine control should the aircraft experiences the "1-engine out" situation.

SUMMARY OF THE INVENTION

Accordingly, a flow path splitter duct is provided for use in a VTOL aircraft. The flow path splitter duct includes a main hub, a first outlet hub and a second outlet hub. The main hub has a plurality of inlet ports each being separated by at least one wall. The first outlet hub has a plurality of first duct outlet ports, each of the first duct outlet ports are in fluid communication with only one of the corresponding plurality of inlet ports. The second outlet hub has a plurality of second duct outlet ports, each of the second duct outlet ports are in fluid communication with only one of the corresponding plurality of inlet ports, wherein engine exhaust gas that enters one of the plurality of inlet ports is simultaneously diverted to only one of the first duct outlet ports and to only one of the second duct outlet ports.

A vertical takeoff and landing aircraft is also provided that includes the flow path splitter duct. A method of using the same is also provided.

The present invention has several advantages over existing VTOL aircraft. One advantage of the present invention is that the aircraft may use ducted engine exhaust gas that passes through one of the primary flow ducts through the main rotor mast to turn the rotor hub and blade when less than all of the engines are operational.

Another advantage of the present invention is that it provides configuration versatility for various applications having differing performance requirements.

Furthermore, the present invention is a key component that allows multiple engines or engine sets to have a separate gas path that may eliminate the engine control engine out problem should the 1-engine out situation occur.

Moreover, the "Dual" flow path splitter duct may direct the gas from the coaxial mast duct and into the rotor blade interface fitting.

The present invention itself, together with further objects and attendant advantages, will be best understood by reference to the following detailed description, taken in conjunction with the accompanying drawing.

DETAILED DESCRIPTION OF THE PREFERRED EMBODIMENT

Figure 1:
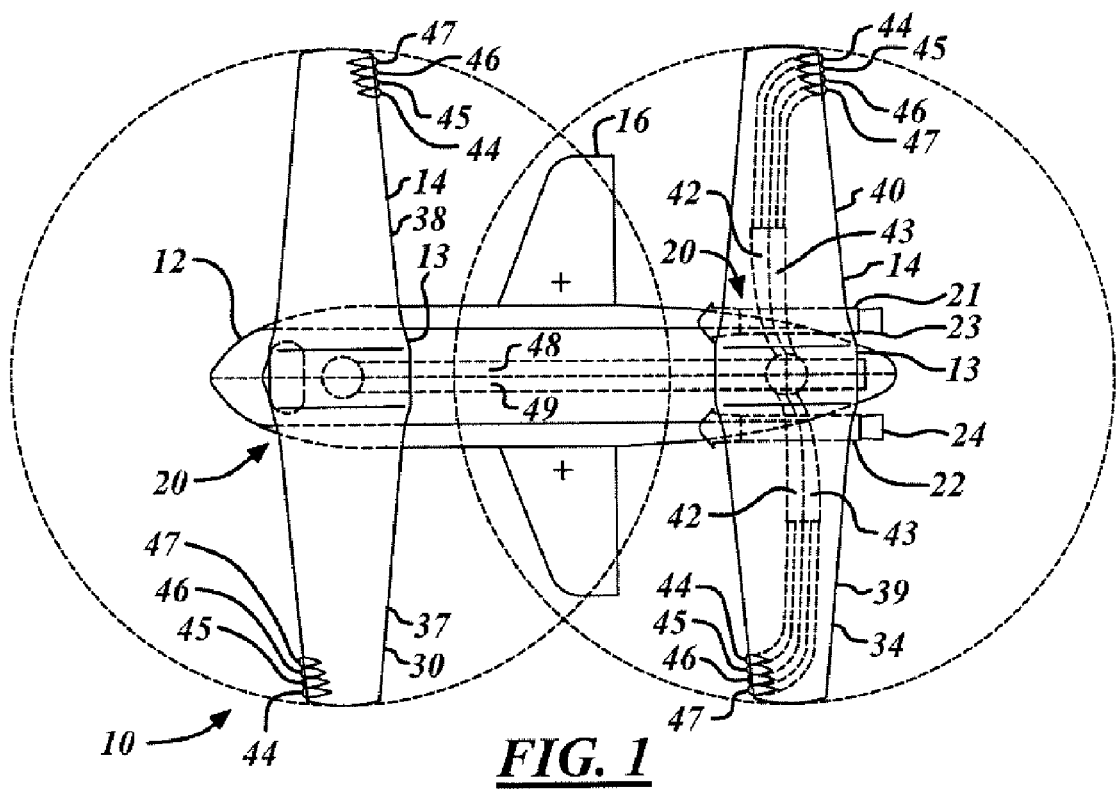
FIG. 1 is a top view of a vertical takeoff and landing (VTOL) aircraft utilizing a tandem rotor/wing configuration in accordance with an embodiment of the present invention.

In each of the following figures, the same reference numerals are used to refer to the same components. While the present invention is described with respect to an article, assembly and method for providing directed fluid propulsion used for lift in a dual-mode aircraft having a vertical lift mode and a fixed wing mode of flight, the present invention may be adapted for various applications and systems known in the art.

In the following description, various operating parameters and components are described for one embodiment. These specific parameters and components are included as examples and are not meant to be limiting. Another embodiment is also presented to illustrate the breadth of the present invention.

FIG. 1 shows a top view of a vertical takeoff and landing (VTOL) aircraft 10 utilizing a tandem rotor/wing configuration in accordance with an embodiment of the present invention. The aircraft 10 includes a fuselage 12, multiple rotor/wing hub assemblies 13 including multiple tandem rotor/wings 14, and a transitional lift wing 16. The fuselage 12 is capable of carrying large loads that may be loaded through a cargo door. The rotor/wings 14 are mechanically coupled to the fuselage 12 via hub assemblies 20, which are rotated by the exhaust gas coming from at least one of the two or more turbofan engines 21, 22 each having engine nozzles 23, 24, respectively. The rotor/wings 14 propel and provide lift for the aircraft 10 in which the engine exhaust gas is used to propel the rotor/wings 14 while it is in vertical lift mode. The rotor/wings 14 operate in dual modes including a vertical lift mode and a fixed wing mode, in conjunction with the engines 21, 22 providing takeoff, landing, and lower speed flight and hover capabilities of a helicopter and forward high speed thrust and lift capabilities of a fixed wing aircraft such as a jet aircraft. As the rotor/wings 14 are transitioned from the vertical lift mode to the fixed wing mode the transitional lift wing 16 provides lift to the aircraft 10. A main controller is coupled to the rotor/wings 14 and switches between the vertical lift mode and the fixed wing mode. Although, two tandem rotor/wings 14 and a single transitional fixed wing 16 are shown various numbers of rotor/wings and fixed wings may be incorporated.

A first tandem rotor/wing 30 is located in a forward portion of the aircraft 10 and a second tandem rotor/wing 34 is located behind the first rotor/wing 30 and in a rearward portion of the aircraft 10, as shown. The first rotor/wing 30 is vertically in a lower location relative to the second rotor/wing 34 to avoid interference during vertical lift mode. The transitional lift wing 16 is located between the first rotor/wing 30 and the second rotor/wing 34 on the fuselage 12. The transitional lift wing 16 is vertically in a lower location relative to both the first rotor/wing 30 and the second rotor/wing 34 to provide central lift of the aircraft 10 and to also avoid interference with the rotor/wings 30 and 34.

The rotor/wings 14 include multiple blades 37, 38, 39, 40 that each have a first primary flow duct 42 and a second primary flow duct 43 extending there through and serving as an exhaust transport between each engine 21, 22 and their associated exit nozzles 44, 45, 46, 47 respectively, during the vertical lift mode. Specifically, exhaust gas from the first engine 21 is distributed to the first primary flow duct 42 and ultimately through the secondary flow ducts having nozzles 44, 45. Exhaust gas from the second engine 22 is distributed to the second primary flow duct 43 and ultimately through the secondary flow ducts having nozzles 46, 47. Because of the relationship of the first and secondary flow ducts in the present embodiment, it is recognized that the exhaust gas flows via the first primary flow duct 42 to the inner two nozzles 44, 45 on blades 38, 39, while the same gas flows to the outer two nozzles 44, 45 on blades 37, 40. It is in this regard, that the primary flow duct is located on the leading edge of blades 38, 39, while the same primary flow duct is located on the trailing edge of blades 37, 40. Also in the current embodiment, the opposite relationship exists for nozzles 46, 47 associated with second primary flow duct 43. It is recognized that the primary flow ducts could be configured so that equal thrust amounts of engine exhaust gas exit from respective nozzles or that the primary or secondary ducts are configured so that exhaust exits the nozzle through the same corresponding inner or outer nozzle sets on blades 39, 40. Although one engine supplies exhaust gas through one of the primary flow ducts, it is recognized that additional engines may be utilized to advantage on a single primary flow duct in which case the exhaust gases from the combined additional engines could then be distributed through one of the primary flow ducts. Also recognized is that there may be more than two primary flow ducts having one or more engines on each primary flow duct path.

The exhaust gases from the engines 21, 22 flow to both the first rotor/wing 30 and the second rotor wing 34 via their primary flow ducts 42, 43 which are respectively coupled to a first and second transport ducts 48, 49, which extend between the rotor/wings 14 along the fuselage 12. Although, the transport ducts 48, 49 are shown as extending through a middle portion of the fuselage 12; the transport ducts may be in other locations and may be along a top portion of the fuselage. The flow ducts 42, 43 and transport ducts 48, 49 are closed during the fixed wing mode and exhaust gases are diverted from entering the rotor/wings 14, via exhaust duct valves. A mast valve may be utilized to divert the exhaust gases from entering the ducts of the rotor/wings 14. The exhaust gases are then directed during fixed wing mode to engine nozzle 23, 24 instead of sets of exit nozzles 44 & 45, 46 & 47 as would be necessary during vertical lift mode.

Figure 2:
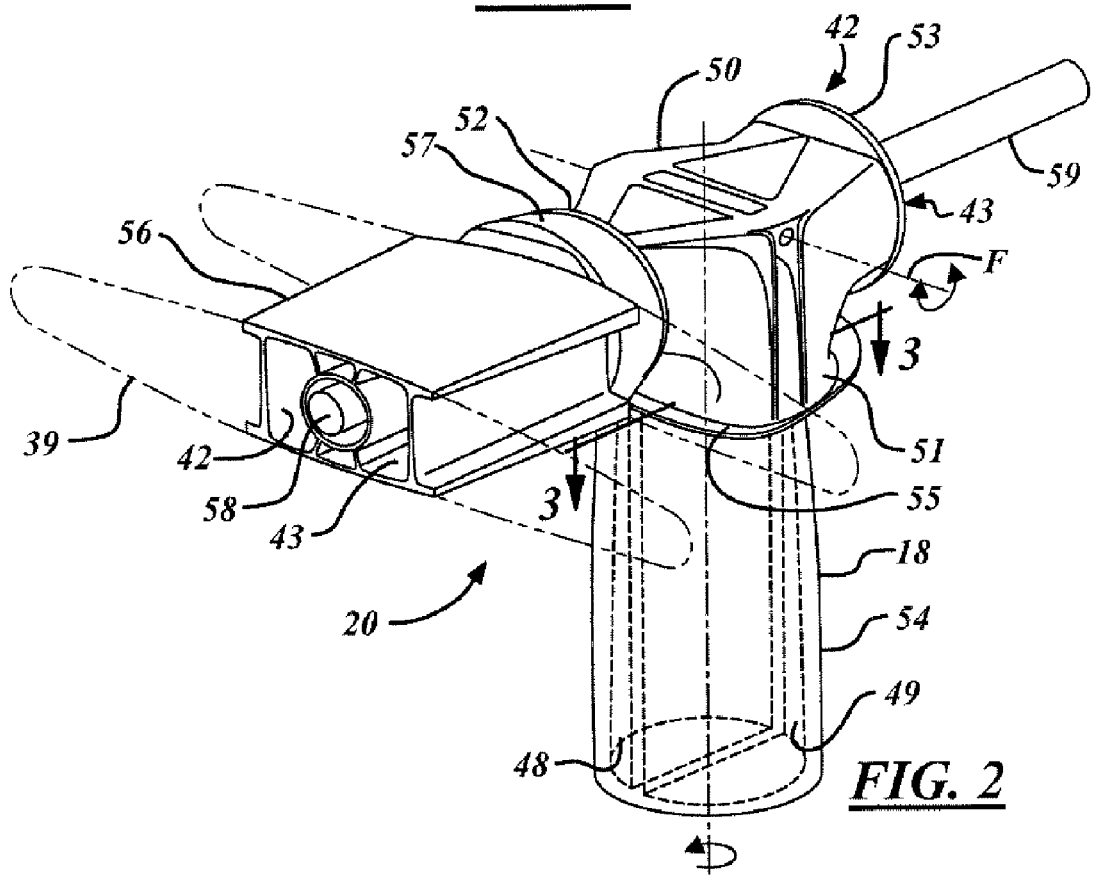
FIG. 2 is a cutaway perspective view of a hub assembly and a mast in accordance with the embodiment of the present invention.

FIG. 2 shows a cutaway perspective view of a hub assembly 20 having a mast 18 in accordance with the embodiment of the present invention. The hub assembly 20 as partially shown includes a flow path splitter duct 50, a mast duct 54, a blade adapter 56 and two spindles 58, 59. The blade adapter 56 is connected to the spindle 58 for receiving the blade 39 as shown, wherein the blade and adapter may be rotationally positioned about the spindle. The Blade adapter 56 has an adapter hub 57 that is positionably connected to a first outlet hub 52 of the flow path splitter duct 50. The Flow path splitter duct 50 also has a second outlet hub 53 for positionably coupling another blade adapter and blade 40 about spindle 59. The flow path splitter duct is rotationally coupled about axis F to the mast duct 54 in a sealing connection between the main hub 51 and mast hub 55, respectively, thereby allowing for flapping control as is known by a person of skill in the art. The hub assembly 20 rotates when in vertical lift mode. While a partial view is presented in FIG. 2 to illustrate the present invention, a person of skill in the art will recognize that controls, linkages and structures may also be included for a complete structure.

The flow path splitter duct 50 sealingly couples the mast duct 54 to the blade adapter 56 so that the engine exhaust gas from the first engine 21 is transported from the first transport duct 48 and into the first primary flow duct 42, and the engine exhaust gas from the second engine 22 is transported from the second transport duct 49 and into the second primary flow duct 43 of both blades 39, 40. The partial mast 18 having mast duct 54 is represented as a split conduit, but may have any necessary shape in order to receive the engine exhaust gas in separate conduits. It is contemplated that the mast duct 54 may have a coaxial duct on its fuselage side for better reception of engine exhaust gages.

Figure 3:
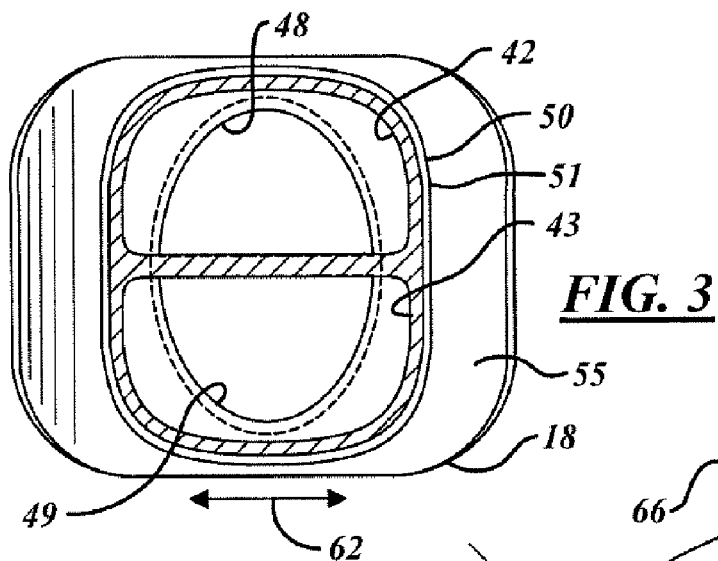
FIG. 3 is a cross-sectional view of a flow path splitter duct and the mast in accordance with the embodiment of the present invention taken as shown in FIG. 2.

FIG. 3 shows a cross-sectional view of a flow path splitter duct 50 and the mast 18 in accordance with the embodiment of the present invention taken as shown in FIG. 2. As previously stated, the flow path splitter duct 50 has flapping motion as generally indicated by arrow 62 with respect to the mast 18. A seal is maintained between the main hub 51 of the flow path splitter duct 50 and the mast hub 55 of the mast 18 during flapping motion such that the engine exhaust gas may pass from the first transport duct 48 and into the first primary flow duct 42 being sealed from the second transport duct 49 that passes gas received from the second engine and into the second primary flow duct 43.

Figure 4:
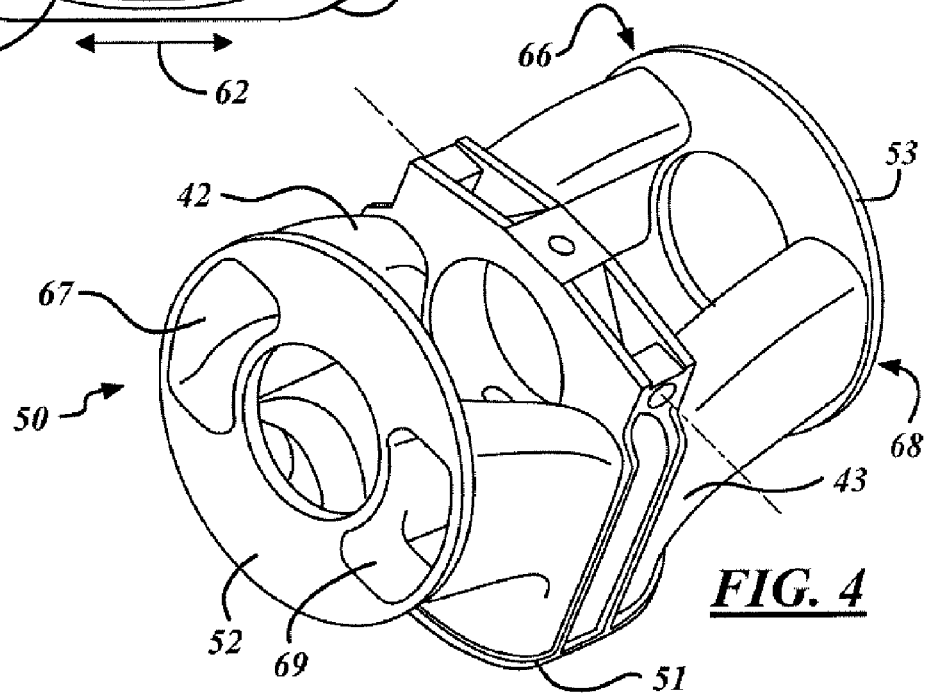
FIG. 4 is a perspective view of the flow path splitter duct in accordance with the embodiment of the present invention.
Figure 5:
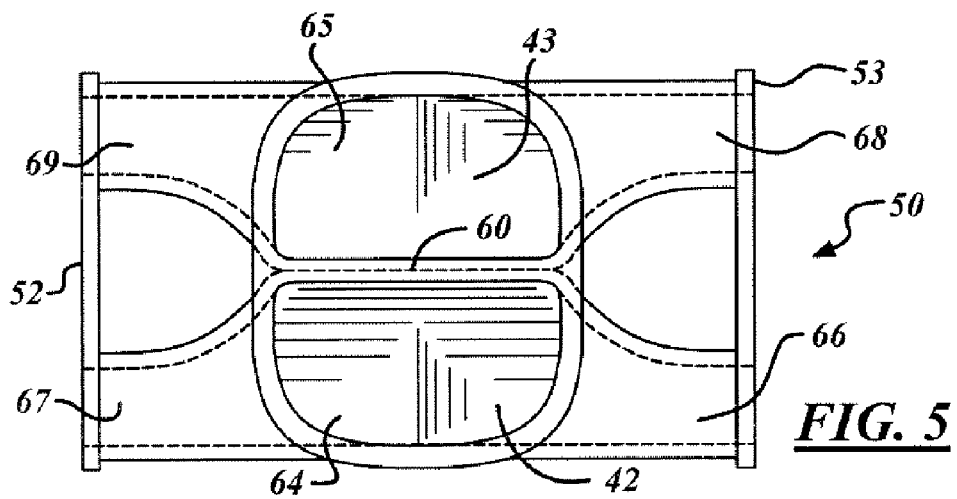
FIG. 5 is a bottom view of the flow path splitter duct in accordance with the embodiment of the present invention.
Figure 6:
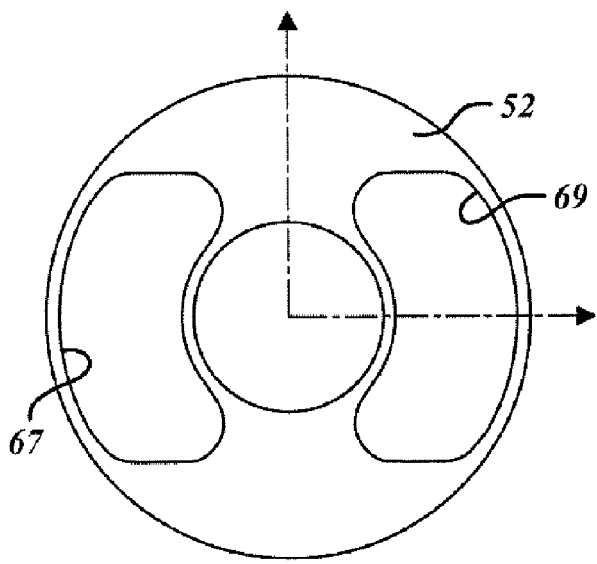
FIG. 6 is a partial side view of the flow path splitter duct in accordance with the embodiment of the present invention.

Simultaneous reference may now be made to FIGS. 4 through 6. FIG. 4 shows a perspective view, FIG. 5 shows a bottom view and FIG. 6 shows a partial side view of the flow path splitter duct 50 all in accordance with the embodiment of the present invention. The first primary flow duct path includes within the flow path splitter duct 50 a first inlet port 64, a right side first outlet port 66 and a left side first outlet port 67. The first inlet port 64 divides the engine exhaust gas received from the first transport duct and passes it respectively to the right and left side first outlet ports 66, 67. Similarly, the second primary flow duct path includes within the flow path splitter duct 50 a second inlet port 65, a right side second outlet port 68 and a left side second outlet port 69. The second inlet port 65 divides the engine exhaust gas received from the second transport duct and passes it respectively to the right and left side second outlet ports 68, 69. The internal geometry of the flow path splitter duct may be configured such that the engine exhaust gas is evenly or proportionally separated to the outlet ports.

The inlet ports 64, 65 are separated from each other by a wall 60 that seals with the mast 18 to provide integrity between the first primary flow duct path 42 and the second primary flow duct path 43. The shape of the inlet and outlet ports may be optimized to obtain maximum exhaust gas flow with minimal resistance. In the present embodiment the outlets ports 67, 69 are kidney shaped and the inlet ports 64, 65 are D-shaped.

Figure 7:
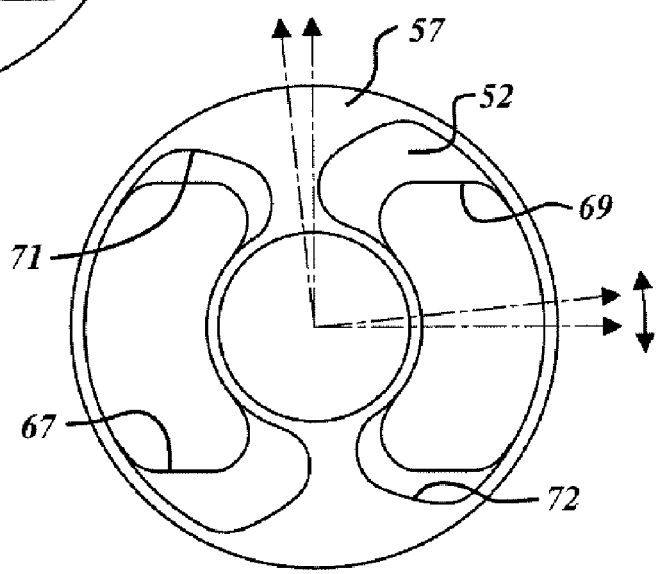
FIG. 7 is a partial left view of the flow path splitter duct in relationship to the adapter hub in accordance with the embodiment of the present invention.

FIG. 7 shows a partial left view of the flow path splitter duct 50 in relationship to the adapter hub 57 in accordance with the embodiment of the present invention. The kidney shaped outlet ports 67, 69 at the first outlet hub 52 of the flow path splitter duct 50 allows engine exhaust gas to pass into the elongated kidney shaped inlet ports 71, 72 at the adapter hub 57 of the blade adapter 56 when the blade 39 is rotated to various positions by the spindle 58. While the ports are shown as a kidney shape, it is recognized that various other shapes may be utilized to advantage and may vary in size and may be affected by the number of primary flow duct paths present within various embodiments of the inventive aircraft.

Figure 8:
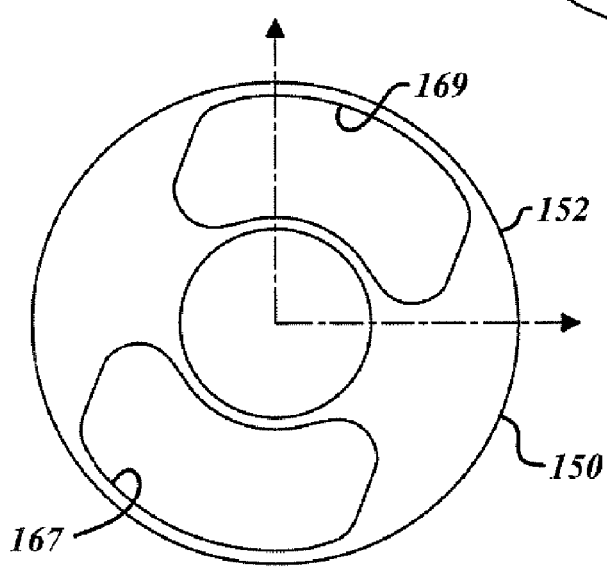
FIG. 8 is a partial side view of the flow path splitter duct in accordance with another embodiment of the present invention.

FIG. 8 is a partial side view of the flow path splitter duct 150 in accordance with another embodiment of the present invention. The kidney shaped outlet ports 167,169 at the first outlet hub 152 of the flow path splitter duct 150 are alternately positioned in order to obtain directed flow from a first primary flow duct to only the outer nozzles on both blades and to obtain directed flow from a second primary flow duct to only the inner nozzles on both blades of a rotor/wing, thereby reducing the offset torque caused by the rotation of the rotor/wing hub assembly.

Generally, the dual flow path splitter duct directs the gas flow from the coaxial mast and into the rotor blade interface fitting. The bottom of each duct has a "D" shaped inlet that is elongated relative to the duct on top of the coaxial mast duct to facilitate the flapping of the main rotor system. Each duct is then divided into 2 separate ducts that transition into a kidney shaped duct that feeds the exhaust gas into the blade interface fitting. The 2 sets of ducts are divided by a vertical wall along the bottom side of the splitter duct that is wide enough to accommodate a sealing device, thereby isolating the exhaust gas flow from the different engines. In the embodiment present above, each set of ducts may supply gas flow to 2 outboard nozzles on 1 blade while supplying the 2 inboard nozzles on the opposite blade. Also, it is recognized that the ducts may supply gas flow is various alternate embodiments or to multiple number of nozzles.

Also, the flow path splitter duct has been set forth above having a dual flow path, however it is recognized that the flow path splitter duct may have multiple paths to improve the "1-engine out" situation.

The above-described article, system and method, to one skilled in the art, are capable of being adapted for various applications and systems known in the art. The above-described invention can also be varied without deviating from the true scope of the invention.

What is claimed is:

1. A vertical takeoff and landing aircraft comprising:
an aircraft fuselage;
a plurality of engines;
at least one hub assembly mechanically coupled to said fuselage having a plurality of transport ducts, each transport duct for selectively receiving engine exhaust gas from one or more of said plurality of engines, said hub assembly being rotated by at least one of said engines;
a flow path splitter duct; and
a tandem rotor/wing coupled to said flow path splitter duct for each of said hub assemblies being mechanically coupled thereto, said tandem rotor/wing having a plurality of primary flow ducts correspondingly receiving engine exhaust gas from said plurality of transport ducts and passing engine exhaust gas to a select plurality of rotor/wing nozzles;
wherein said flow path splitter duct comprises:
a main hub having a plurality of inlet ports each being separated by at least one wall,
a first outlet hub having a plurality of first duct outlet ports, each of the first duct outlet ports in fluid communication with only one of the corresponding plurality of inlet ports, and
a second outlet hub having a plurality of second duct outlet ports, each of the second duct outlet ports in fluid communication with only one of the corresponding plurality of inlet ports,
wherein engine exhaust gas entering one of the plurality of inlet ports is simultaneously diverted to only one of the first duct outlet ports and to only one of the second duct outlet ports, and
wherein each of said inlet ports is individually in fluid communication with one of each of said plurality of transport ducts, and
wherein each of said outlet ports are in fluid communication with one of each of said plurality of primary flow ducts.

2. The aircraft of claim 1 wherein said tandem rotor/wing includes a first blade and a second blade; said first blade having four nozzles, of which two nozzles are ducted to a first primary flow duct and the other two nozzles are ducted to a second primary flow duct; and said second blade having four nozzles, of which two nozzles are ducted to said first primary flow duct and the other two nozzles are ducted to said second primary flow duct, wherein said first primary flow duct receives engine exhaust gas via a first transport duct from one of said engines and said second primary flow duct receives engine exhaust gas via a second transport duct from another of said engines.

3. The aircraft of claim 2 wherein said first primary flow duct is coupled to said outer two nozzles of said first blade and said outer two nozzles of said second blade.

4. The aircraft of claim 2 wherein said first primary flow duct is coupled to said outer two nozzles of said first blade and said inner two nozzles of said second blade.

5. The aircraft of claim 1 wherein said plurality of second duct outlet ports or said plurality of first duct outlet ports is symmetrically offset vertically about said outlet hub.

6. The aircraft of claim 1
wherein said main hub is perpendicular to said first outlet hub, wherein said first outlet hub is parallel to but in the opposite direction from said second outlet hub, and
wherein at least one of said plurality of inlet ports are D shaped and at least one of said plurality of duct outlet ports is kidney shaped.

7. A method of propelling and lifting an aircraft in a 1-engine out situation comprising:

providing an aircraft fuselage;

providing a plurality of engines;

providing at least one hub assembly mechanically coupled to said fuselage having a plurality of transport ducts, each transport duct for selectively receiving engine exhaust gas from one or more of said plurality of engines, said hub assembly being rotated by at least one of said engines;

providing a flow path splitter duct;

providing a tandem rotor/wing coupled to said flow path splitter duct for each of said hub assemblies being mechanically coupled thereto, said tandem rotor/wing having a plurality of primary flow ducts correspondingly receiving engine exhaust gas from said plurality of transport ducts and passing engine exhaust gas to a select plurality of rotor/wing nozzles; and directing the engine exhaust gas from less than said plurality of engines to a selected set of nozzles through a selected set of transport ducts and primary flow ducts when less than said plurality of engines are operating.

8. A method of claim 7 wherein the plurality of engines comprises three and wherein said tandem rotor/wing includes a first blade and a second blade; said first blade having four nozzles, of which two nozzles are ducted to a first primary flow duct and the other two nozzles are ducted to a second and third primary flow ducts, respectively; and said second blade having four nozzles, of which two nozzles are ducted to said first primary flow duct and the other two nozzles are ducted to said second and said third primary flow ducts, respectively, wherein said first primary flow duct receives engine exhaust gas via a first transport duct from said first engine and said second primary flow duct receives engine exhaust gas via a second transport duct from said second engine, when said third engine is non-operable.

* * * * *